March 17, 1931. R. V. SPENCER 1,797,160
AEROPLANE
Filed Sept. 3, 1929  5 Sheets-Sheet 1
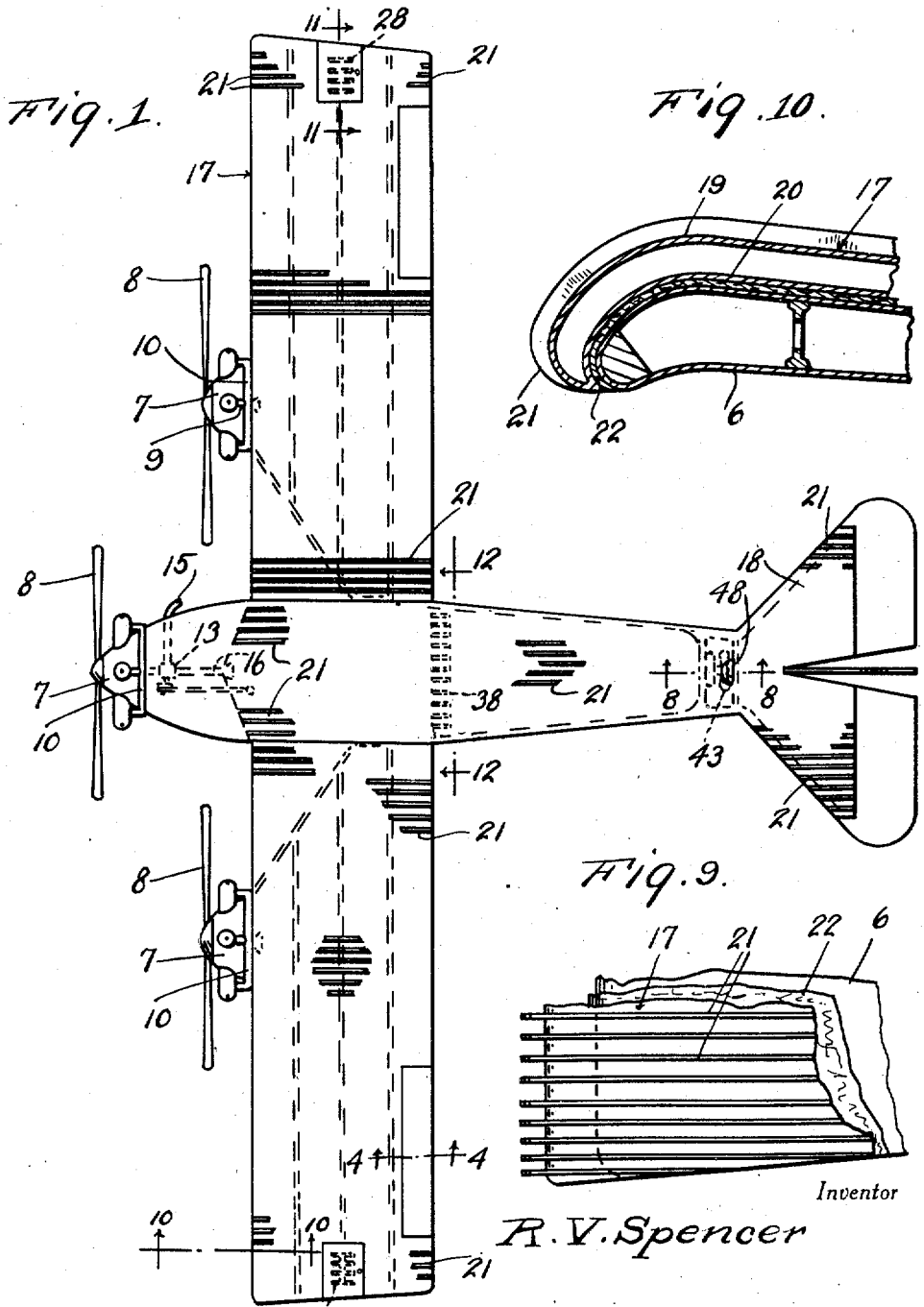
Inventor
R. V. Spencer
By Clarence A. O'Brien
Attorney March 17, 1931.   R. V. SPENCER   1,797,160
AEROPLANE
Filed Sept. 3, 1929    5 Sheets-Sheet 2
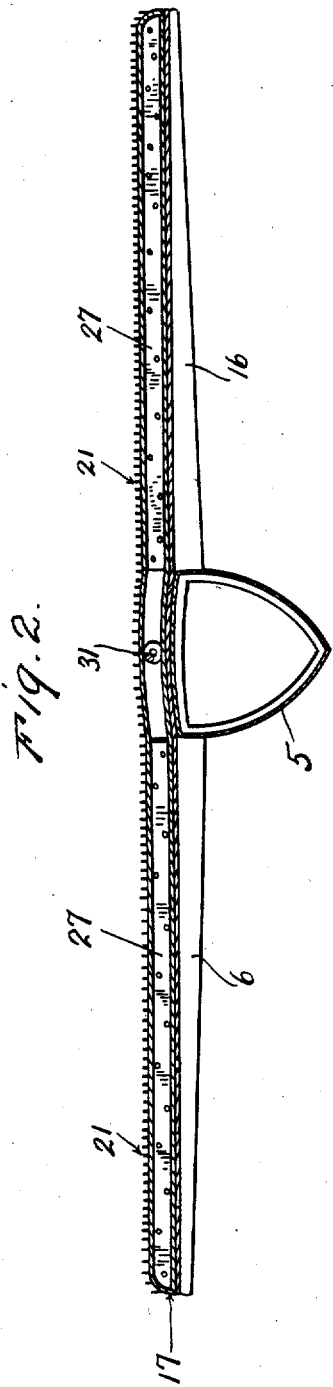
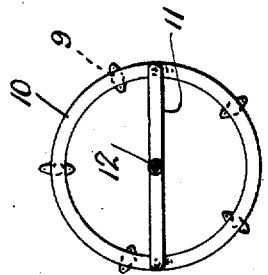
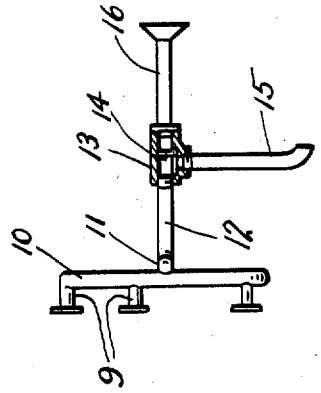
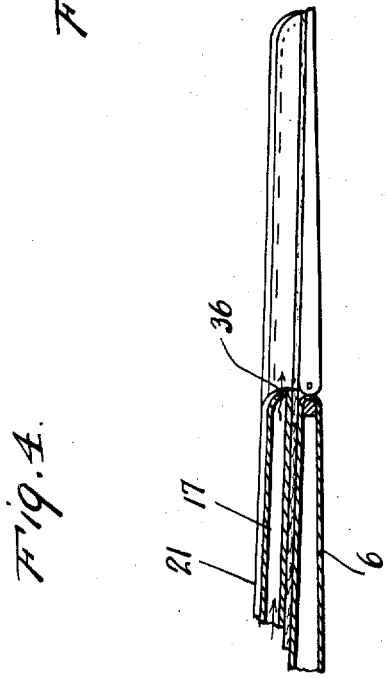
Inventor
R. V. Spencer
By Clarence A. O'Brien
Attorney March 17, 1931. R. V. SPENCER 1,797,160
AEROPLANE
Filed Sept. 3, 1929 5 Sheets-Sheet 3
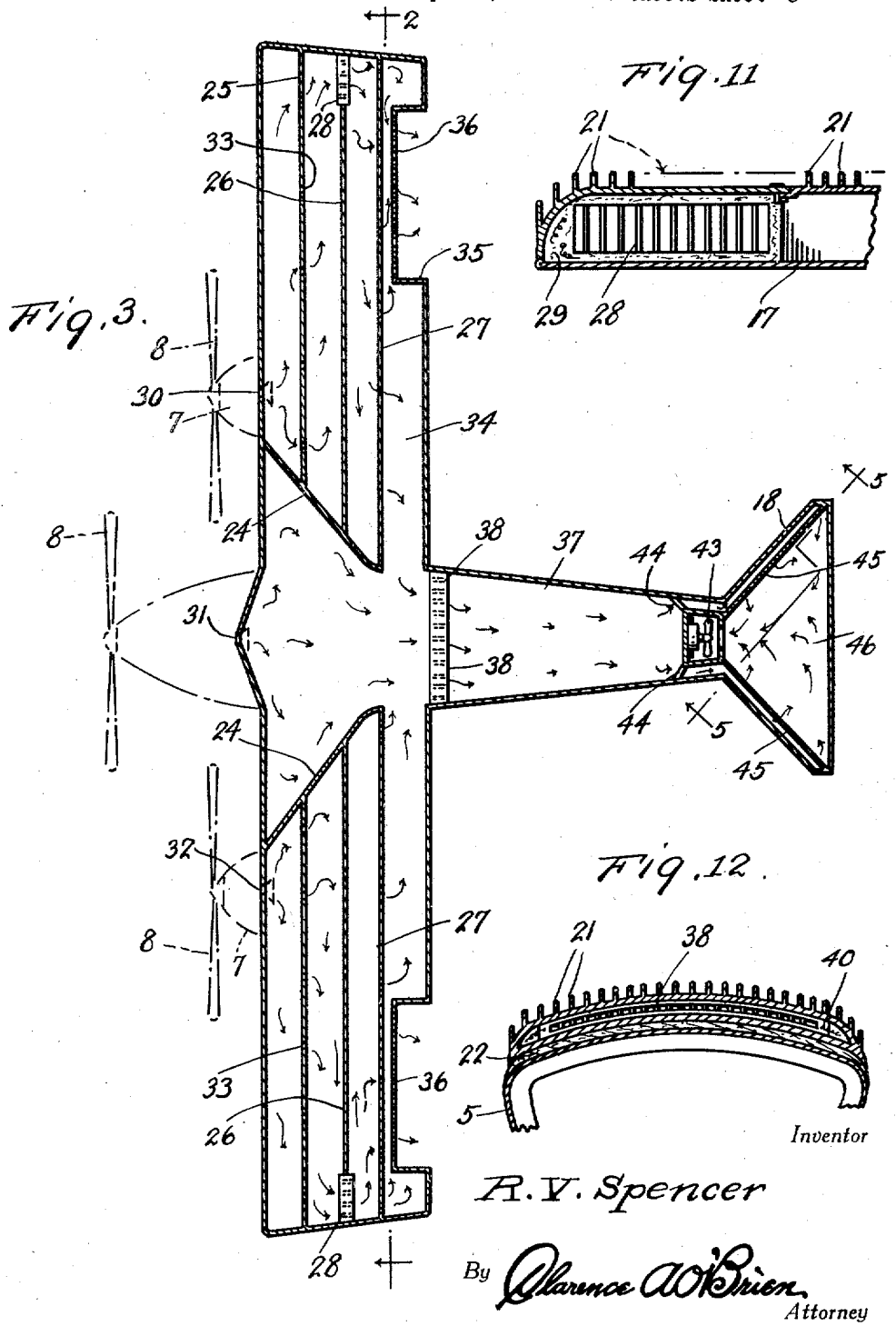

March 17, 1931. R. V. SPENCER 1,797,160
AEROPLANE
Filed Sept. 3, 1929 5 Sheets-Sheet 4

Inventor
R. V. Spencer
By Clarence A. O'Brien
Attorney

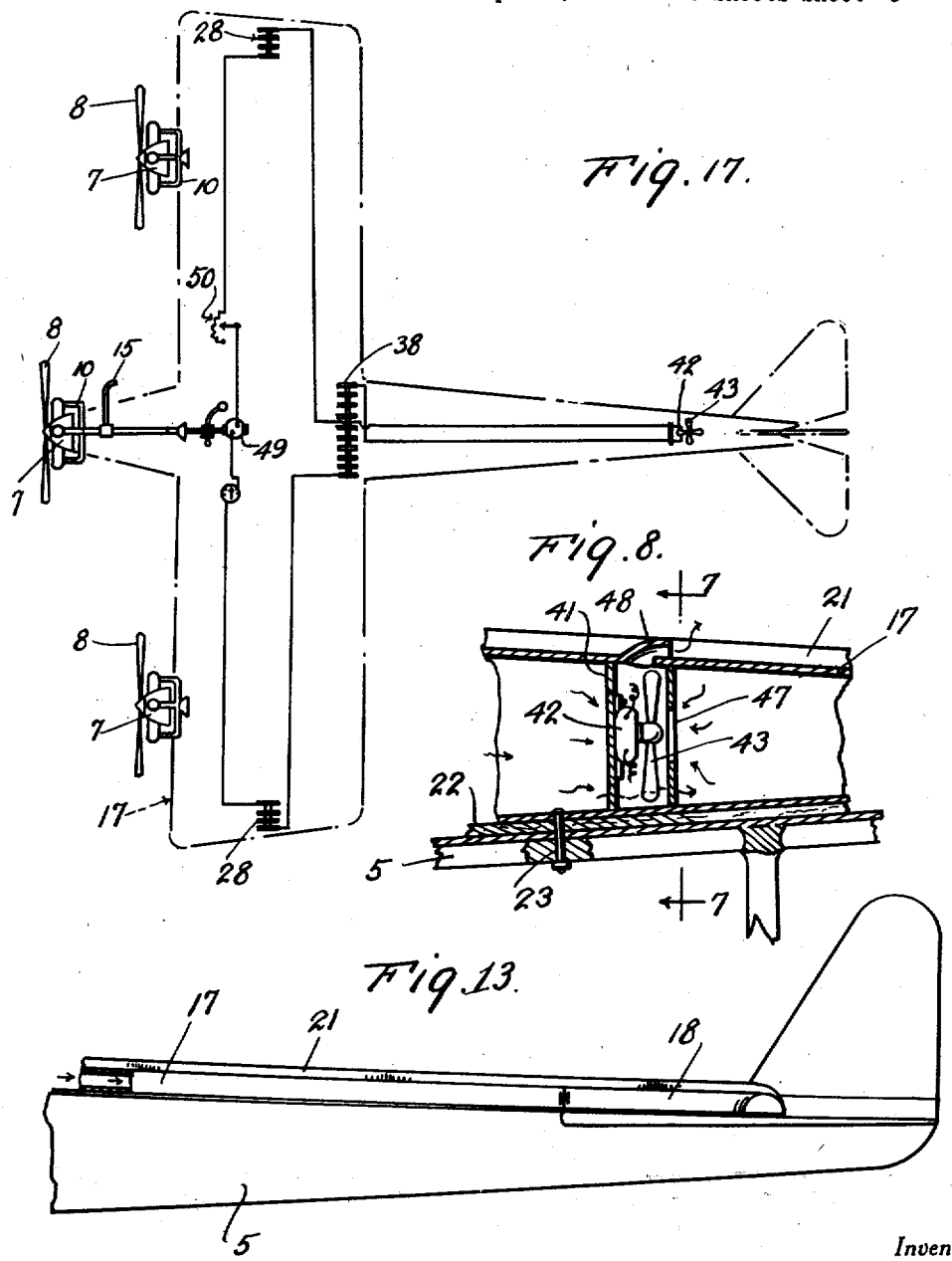

Patented Mar. 17, 1931

1,797,160

UNITED STATES PATENT OFFICE

RICHARD V. SPENCER, OF LOS ANGELES, CALIFORNIA

AEROPLANE

Application filed September 3, 1929. Serial No. 389,998.

This invention appertains to new and useful improvements in the art generally known as aeronautics, and more particularly to improvements in means for heating the outer surfaces of the aircraft during cold weather to prevent the formation of ice thereon.

The principal object of this invention is to provide means in the form of an attachment for aeroplanes whereby conventional types of aeroplanes may have their top surfaces heated to prevent the formation of ice or the collection of snow thereon.

Another important object of this invention is to provide a removable heating jacket for aeroplanes into which the exhaust of the usual propulsion motors may discharge with the end in view of maintaining the parts of an aircraft which most frequently accumulate ice and snow thoroughly heated to prevent such accumulations.

During the course of the following specification and claims, numerous other important objects and advantages of the invention will readily become apparent.

In the drawings:

Figure 1 represents a top plan view of an aeroplane equipped with the present invention.

Figure 2 represents a longitudinal sectional view on line 2—2 of Figure 3.

Figure 3 represents a horizontal sectional view through the present invention and by arrows disclosing the route of the exhaust fumes from the motors.

Figure 4 represents a fragmentary sectional view taken substantially on line 4—4 of Figure 1.

Figure 8 represents a fragmentary vertical sectional view through the suction fan and adjacent structure of the invention and aircraft.

Figure 9 represents a fragmentary top plan view of an aeroplane wing equipped with the present invention.

Figure 10 represents an enlarged fragmentary transverse sectional view taken substantially on line 10—10 of Figure 1.

Figure 11 represents a fragmentary vertical sectional view taken substantially on line 11—11 of Figure 1.

Figure 12 represents a cross sectional view taken substantially on line 12—12 of Figure 1.

Figure 13 represents a fragmentary side elevation of an aeroplane with the invention superimposed thereon.

Figure 14 represents a rear elevation of the exhaust pipes from the cylinders of one motor.

Figure 15 represents a side elevation of the exhaust pipes of a motor and showing in section a valve whereby the exhaust gases may be diverted from the usual discharge to the atmosphere into the attachment comprising the present invention.

Figure 17 represents a diagrammatic view disclosing the electrical connections between the heating unit and the generator and suction fan motor.

Figure 5:
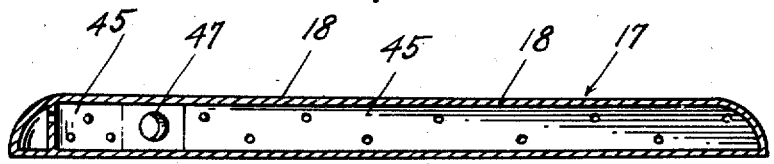
Figure 5 represents a vertical sectional view taken substantially on line 5—5 of Figure 3.

Referring to the drawings wherein like numerals designate like parts, it will be seen that this invention may be associated with any aeroplane of generally conventional construction. In the drawings accompanying this description, an aeroplane of the monoplane type is represented wherein the fuselage is denoted by numeral 5 with the wings 6—6 projecting from the sides thereof in the manner sectionally shown in Figure 2.

The wings 6—6 as well as the nose of the fuselage are equipped with motors 7 in driving connection with propellers 8.

In Figure 14 it will be seen that the cylinders of each engine 7 communicate through the pipe 9 with an annular tube 10. A diametrically extending pipe 11 has its ends communicatively connected with the annular tube 10 in the manner shown in Figure 14, and from this pipe 11 extends the pipe 12 connecting to a valve shell 13. This valve shell 13 has a pivotal valve plate 14 therein and outlet pipes 15 and 16 extending therefrom.

The normal passage of the exhaust gases is through the pipe 12 and pipes 15. However, by moving the valve plate 14 so as to close the pipe 15, the pipe 16 is communicated with the pipe 12 and the exhaust gases will discharge into the compartment within the structure designated as this invention, and which will be fully described hereinafter.

The invention consists in providing a T-shaped blanket generally referred to by numeral 17. This blanket is superimposed upon the wings and fuselage of the aircraft in the manner clearly shown in the drawings. The tail portion of the blanket is flared as at 18 for partial disposition over the stabilizers at the rear end of the aircraft. This blanket includes an upper ply 19 and a lower ply 20, the forward edge portion of the same being disposed downwardly around the edge of the wing 6 in the manner clearly shown in Figure 10.

The wing portions of the blanket have their top plies provided with transversely extending fins 21, which are only fragmentarily shown in Figure 1. The lower plies of the blanket are insulated from the wings and fuselage fabric by means of an asbestos sheet or sheets 22. The blanket is secured to the aircraft by suitable bolts 23, as shown in Figure 8 or in fact, any other suitable securing means. It will be seen that by a prearrangement of partitions between the upper and lower plies, the same will be separated so as to provide a compartment through which the exhaust gases from the motors may pass, and maintain the top surface of the aircraft heated.

In Figure 3, it can be seen that a pair of rearwardly converging partitions 24—24 are arranged between the upper and lower plies and are connected each to the corresponding end wall of the blanket by longitudinally extending partitions 25 and 26 and 27. The outer end of each partition 26 is cut away to accommodate an electrical heating grid 28, which is arranged with a di-electric frame 29. (See Figure 11.)

It will now be seen that the exhaust gases from the motor will pass through the openings 30, 31 and 32 and pass into the compartment between each of the partitions 25 and the forward side wall of the blanket. The partition 25 being perforated as at 33 permits the hot gases to pass into the compartment between the partition 26 and the partition 25. The partition 26 is not provided with openings, hence the gas must pass toward one end thereof and through the heated grid 28 where the gas is again heated before progressing further. The partition 27 of each wing portion of the blanket is perforated so as to permit the hot gases to pass into the main chamber 34.

Figure 6:
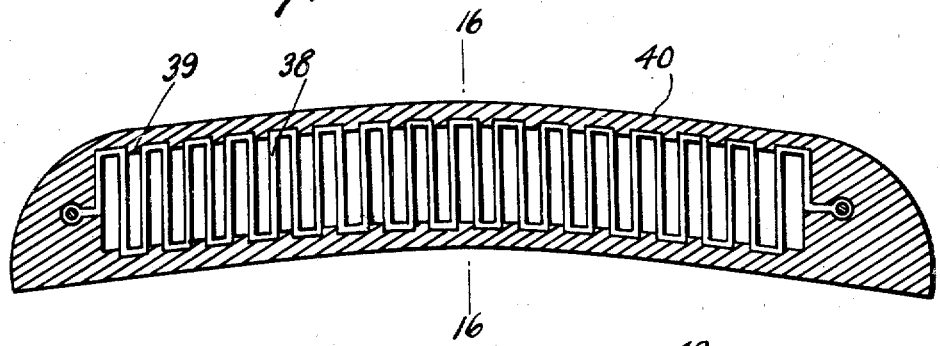
Figure 6 represents a cross sectional view of one of the electro-heating bridges.
Figure 7:
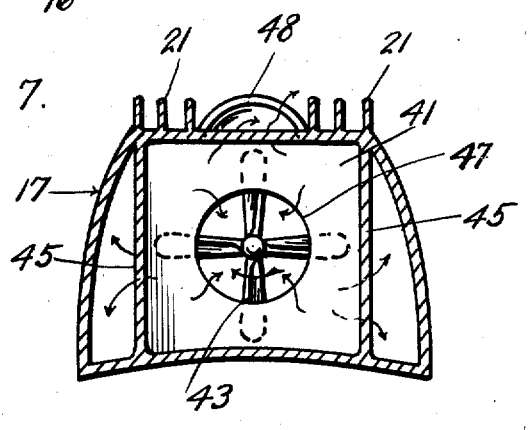
Figure 7 represents a cross sectional view taken substantially on line 7—7 of Figure 8.
Figure 16:
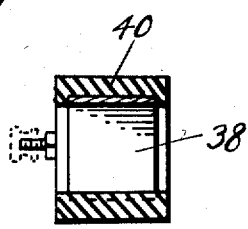
Figure 16 represents a cross sectional view taken substantially on line 16—16 of Figure 6.

As is clearly shown in Figure 4, each wing portion of the blanket is cut away as at 35 to accommodate the usual aileron and to maintain these ailerons heated, the rear edge of the blanket at these cut-away portions 35 are perforated as at 36 to permit the escape of hot gases onto the same. The chamber 34 is separated from the chamber 37 of the blanket by the transversely extending electro-heating grid 38, which grid is arranged in the manner clearly shown in Figure 6 and within the opening 39 of a di-electric frame 40.

The ends of the grid strip are connected to suitable binding posts whereby connections may be easily made to a controlling agent.

As before explained, the rear end portion of the said blanket flares as at 18 to cover the stationary portion of the stabilizer. Within the constricted portion of the rear end of the blanket (that is inwardly from the aforementioned flared portion) a housing 41 is mounted for supporting an electro-motor 42. This motor is in driving relation with a fan 43 and the said housing is separated from the side walls of the fuselage by means of braces 44. Extending within the flared portion of the blanket and in spaced parallel relation with respect to the side walls thereof are partitions 45, the same being perforated to permit the entrance of the heated exhaust gases into the chamber 46. (See Figure 3.) The rear wall of the housing 41 is provided with an opening 47 so that the fan may exert a suction to draw the heated gases from all points within the blanket through the perforated partition 35 and into the chamber 46.

An outlet 48 is provided for the fan housing so that the gases sucked thereinto will discharge into the atmosphere. In Figure 17, the generator 49 is connected in a circuit with the heating grids 28, 38, and motor 42, and this circuit is controlled by means of a rheostat 50.

It will thus be seen that while the exhaust gases are extremely hot and discharge from the pipe 16, they will in following the tortuous route through the perforated partition lose a considerable amount of this heat and re-heated by means of the aforementioned heating grids 28 and 38. While it is expected that the gas will thoroughly heat the top side of the aeroplane, the gases are not permitted to become inert within the blanket, but are continuously moved by means of the suction fans 43 driven by the motor 42.

It will thus be seen that the hazards encountered by the presence of ice or snow accumulated on the wings and fuselage of aircraft will be greatly lessened without incumbering the weight of the aircraft.

While the foregoing specification has described the invention in detail, it is to be understood that various changes in the shape, size and materials may be resorted to without departing from the spirit and scope of the invention as claimed hereinafter.

Having described the invention, what is claimed as new is:

1. Means for heating exposed parts of aircraft comprising a jacket for disposition over the exposed portion of the aircraft and means for discharging the exhaust gases from the usual motors into the said jacket, and a tortuous passageway for the gas within the jacket and means for reheating the gas at intervals within the said passageway.

2. Means for heating exposed parts of aircraft comprising a jacket for disposition over the exposed portion of the aircraft and means for discharging the exhaust gases from the usual motors into the said jacket, a tortuous passageway for the gas within the jacket, and means for reheating the gas at intervals within the said passageway, and a suction fan at the exhaust end of the said tortuous passageway.

3. Means for heating exposed parts of aircraft comprising a hollow body for disposition upon the exposed portion of the aircraft, an inlet for the exhaust gases of the usual aircraft motor, partitions arranged within the said hollow body for causing the said gas to follow a tortuous route, and means within the confines of the said partitions whereby the gas may be reheated.

4. Means for heating exposed parts of aircraft comprising a hollow body for disposition upon the exposed portion of the aircraft, an inlet for the exhaust gases of the usual aircraft motor, partitions arranged within the said hollow body for causing the said gas to follow a tortuous route, and means within the confines of the said partitions whereby the gas may be reheated, and a suction fan arranged within the said hollow body and at the discharge end of the said partition arrangement.

5. Means for heating the top surface of aeroplanes comprising a hollow body of the general configuration of an aeroplane and being adapted for disposition upon the aeroplane, means for heating a fluid within the said body, and means for maintaining the heated fluid in movement through the said body, the rear end of the said body being flared for disposition over the usual stabilizers of the aeroplane, and means within the said flared portion for causing the gases to permeate the entire interior thereof.

6. Means for preventing the formation of ice upon the top surface of an aeroplane comprising a hollow body superimposed upon the wings and fuselage of the aeroplane, means for introducing hot gases inside of the said body at spaced points, means arranged at spaced points within said body for reheating the gases, and means for maintaining the said gases in movement through the body.

7. Means for preventing the formation of ice upon the top surface of an aeroplane comprising a hollow body superimposed upon the wings and fuselage of the aeroplane and internally partitioned to provide tortuous gas passages and a remote outlet chamber and a connecting chamber between the outlet chamber and the tortuous gas passages, and means for introducing hot gases into the gas passages, and suction means within the outlet chamber for maintaining the gases in movement through the body.

In testimony whereof I affix my signature.

RICHARD V. SPENCER.